United States Patent
Janket et al.

(10) Patent No.: US 12,522,166 B2
(45) Date of Patent: Jan. 13, 2026

(54) DECORATIVE GRILLE FOR A VEHICLE FRONT

(71) Applicant: Bayerische Motoren Werke Aktiengesellschaft, Munich (DE)

(72) Inventors: Haci Korkusuz Janket, Putzbrunn (DE); Martin Riedner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 247 days.

(21) Appl. No.: 17/915,814

(22) PCT Filed: Jun. 2, 2021

(86) PCT No.: PCT/EP2021/064759
§ 371 (c)(1),
(2) Date: Sep. 29, 2022

(87) PCT Pub. No.: WO2021/249841
PCT Pub. Date: Dec. 16, 2021

(65) Prior Publication Data
US 2023/0158980 A1    May 25, 2023

(30) Foreign Application Priority Data
Jun. 10, 2020 (DE) .................... 10 2020 115 446.1

(51) Int. Cl.
*B60R 19/52* (2006.01)
*B60Q 1/00* (2006.01)

(52) U.S. Cl.
CPC ............ *B60R 19/52* (2013.01); *B60Q 1/0017* (2013.01); *B60Q 1/0035* (2013.01); *B60R 2019/525* (2013.01)

(58) Field of Classification Search
CPC . B60R 19/52; B60R 2019/525; B60Q 1/0017; B60Q 1/0035
See application file for complete search history.

(56) References Cited

U.S. PATENT DOCUMENTS

| 11,060,688 | B1* | 7/2021 | Lee ......................... F21S 43/14 |
| 2006/0104074 | A1 | 5/2006 | Boniface et al. |
| 2006/0114686 | A1 | 6/2006 | Liu |

(Continued)

FOREIGN PATENT DOCUMENTS

| CN | 202764900 U | 3/2013 |
| CN | 103987576 A | 8/2014 |

(Continued)

OTHER PUBLICATIONS

International Search Report (PCT/ISA/210) issued in PCT Application No. PCT/EP2021/064759 dated Jul. 27, 2021 with English translation (eight (8) pages).

(Continued)

*Primary Examiner* — Daniel J Colilla
(74) *Attorney, Agent, or Firm* — Crowell & Moring LLP

(57) ABSTRACT

A decorative grille for a front of a vehicle is provided. The decorative grille has a grille frame connectible to the vehicle front, and a lighting device. The decorative grille frame accommodates the lighting device. The lighting device is located entirely behind a point which is frontmost relative to the vehicle longitudinal direction of the decorative grille frame.

9 Claims, 1 Drawing Sheet

(56) References Cited

U.S. PATENT DOCUMENTS

| | | | |
|---|---|---|---|
| 2008/0253140 A1* | 10/2008 | Fleischmann | G02B 6/006 |
| | | | 29/832 |
| 2013/0293104 A1 | 11/2013 | Wu | |
| 2013/0335997 A1 | 12/2013 | Roberts et al. | |
| 2014/0347871 A1 | 11/2014 | Huttenlocher | |
| 2016/0090027 A1 | 3/2016 | Tanaka et al. | |
| 2018/0272927 A1* | 9/2018 | Moore | B60Q 1/2661 |
| 2019/0275932 A1* | 9/2019 | Cho | B60Q 3/64 |
| 2020/0109822 A1 | 4/2020 | Kim | |
| 2021/0023982 A1* | 1/2021 | Guenther | F21S 41/24 |

FOREIGN PATENT DOCUMENTS

| | | | | |
|---|---|---|---|---|
| CN | 204055319 U | | 12/2014 | |
| CN | 204354974 U | * | 5/2015 | |
| CN | 111023033 A | | 4/2020 | |
| DE | 24 52 337 A1 | | 5/1976 | |
| DE | 103 37 617 A1 | | 3/2005 | |
| DE | 20 2012 008 792 U1 | | 2/2013 | |
| DE | 10 2011 120 363 A1 | | 6/2013 | |
| DE | 20 2013 102 543 U1 | | 8/2013 | |
| DE | 10 2014 015 185 A1 | | 4/2015 | |
| DE | 102016014605 A1 | * | 6/2018 | B60R 19/483 |
| DE | 10 2018 207 270 A1 | | 11/2019 | |
| FR | 3026821 A1 | * | 4/2016 | B60R 19/48 |
| JP | 2001-105966 A | | 4/2001 | |
| JP | 5398044 B1 | * | 1/2014 | |
| JP | 2015-99654 A | | 5/2015 | |
| KR | 200323272 Y1 | * | 8/2003 | B60R 13/14 |
| WO | WO-2018073678 A1 | * | 4/2018 | B60Q 1/2661 |
| WO | WO-2020074739 A1 | * | 4/2020 | B60Q 1/0035 |

OTHER PUBLICATIONS

German-language Written Opinion (PCT/ISA/237) issued in PCT Application No. PCT/EP2021/064759 dated Jul. 27, 2021 (five (5) pages).

German-language Search Report issued in German Application No. 10 2020 115 446.1 dated Oct. 14, 2020 with partial English translation (11 pages).

English translation of Chinese-language Office Action issued in Chinese Application No. 202180022237.8 dated Feb. 24, 2025 (8 pages).

English translation of Chinese-language Office Action issued in Chinese Application No. 202180022237.8 dated Aug. 29, 2025 (7 pages).

* cited by examiner

DECORATIVE GRILLE FOR A VEHICLE FRONT

BACKGROUND AND SUMMARY

The present invention relates to a decorative grille for a front of a vehicle, a vehicle front having the decorative grille, and a vehicle having the vehicle front.

Decorative grilles attached to the vehicle front, in particular having an illuminated frame, are known in general from the prior art.

Thus, for example, US 2006/0104074 A1 discloses a front side of a vehicle body which defines an air inlet opening, wherein a light source that can be illuminated selectively at least partially encloses the air inlet opening.

It has to be ensured in the case of such illuminated frames on the vehicle front that no damage to the illumination occurs in the event of a collision of the vehicle at low speeds, for example, less than 5 km/h, in the case of a certain force or energy which in particular acts frontally on the vehicle front.

The suitability of the illuminated frame attached to the vehicle front for withstanding such external force effects is to be proven by a vehicle monitures, inter alia, in the context of a test according to ECE-R42 and/or US part 581, wherein, for example, in the test according to ECE-R42, a bumper of the relevant test vehicle is subjected to an impact carriage or an impact pendulum equal in mass to the test vehicle, which is fastened on a pendulum arm at least 3 m long.

To meet these requirements and to achieve a type approval, an illuminated decorative grille frame is known from the prior art, which accommodates bars or ribs spaced apart from one another, wherein a light of the decorative grille frame is arranged behind the bars in the vehicle longitudinal direction.

A direct force action on the light, for example, during a so-called "low-speed crash" or the pendulum in the test according to ECE-R42, can be avoided by the light of the decorative grille frame which is offset to the rear in the vehicle longitudinal direction.

The solution known from the prior art has the problem that the light is partially concealed by the bars arranged in front of the light in the vehicle longitudinal direction. This reduces a light outlet surface of the light, on the one hand, and results in a heterogeneous appearance of the vehicle front, on the other hand.

The object of the invention is therefore to provide a system which is designed, inter alia, to overcome these disadvantages from the prior art.

This object is achieved according to the invention by the features of the independent claims. Advantageous embodiments are specified in the dependent claims.

Accordingly, the object is achieved by a decorative grille for a front of a vehicle. The decorative grille has a decorative grille frame connectable to the vehicle front and a lighting device. The decorative grille frame accommodates the lighting device. The lighting device is arranged completely behind a frontmost point of the decorative grille frame in the vehicle longitudinal direction.

The vehicle front can be a part of the vehicle which is arranged in front of a A-pillar of the vehicle in the vehicle longitudinal direction. The vehicle can be a motor vehicle, in particular a passenger vehicle.

The decorative grille can be arranged in front on the vehicle front in the vehicle longitudinal direction. It is contemplated that the vehicle front has two decorative grilles arranged spaced apart from one another in the vehicle width direction, which jointly form a so-called kidney of the vehicle.

The lighting device can have, for example, one or more light-emitting diode(s) (LED). The lighting device is designed to emit light in a range visible to the human eye.

Because the lighting device is arranged completely behind a frontmost point of the decorative grille frame in the vehicle longitudinal direction, legal-technical requirements can be met, for example, the ECE-R42 pendulum test described at the outset and preventing damage to a light outlet surface on the decorative element or decorative grille.

The decorative grille frame can accommodate ribs spaced apart from one another. The lighting device can be arranged in front of the ribs in the vehicle longitudinal direction.

The ribs can extend in a vehicle vertical direction and can be spaced apart from one another in the vehicle width direction. It is also contemplated that the ribs extend in the vehicle width direction and are spaced apart from one another in the vehicle vertical direction.

As is furthermore described at the outset, it is not possible in conventional systems to arrange the lighting device in front of the ribs, since otherwise, for example, the ECE-R42 pendulum test cannot be complied with.

In the present case, the decorative grille frame which is brought forward acts as protection for the lighting device insofar as the decorative grille frame absorbs externally acting forces and introduces them into a component of the vehicle adjoining the decorative grille frame, for example, a multifunction frame arranged behind the decorative grille in the vehicle longitudinal direction.

Furthermore, the lighting device, since the decorative grille frame accommodates the lighting device, is also displaced to the rear in the event of a displacement of the decorative grille frame in the vehicle longitudinal direction, so that no contact of the lighting device with the external impactor occurs, for example, the pendulum in the ECE-R42 pendulum test.

Damage to the lighting device can thus be prevented, even if it is arranged in front of the ribs of the decorative grille in the vehicle longitudinal direction. This results in a homogeneous appearance and an enlarged light outlet surface visible from the outside on the vehicle in comparison to the prior art.

The lighting device can be arranged in the vehicle longitudinal direction completely behind a contour, which delimits the decorative grille frame to the front in the vehicle longitudinal direction, having the frontmost point at least in the region in which the lighting device extends along the contour.

The lighting device can be arranged in the form of a tube and can follow the contour of the decorative grille frame, which delimits the decorative grille frame to the front in the vehicle longitudinal direction.

The contour can be the outline or the silhouette of the decorative grille frame, which represents a curve that delimits the decorative grille frame from its surroundings to an observer who looks from the front at the vehicle front.

The contour can also be referred to as a decorative grille ring. This can be embodied as painted, unpainted, or chromed.

The lighting device can be arranged in the vehicle longitudinal direction in particular completely behind the contour delimiting the decorative grille frame to the front in the vehicle longitudinal direction.

The lighting device can be arranged inside and/or outside the decorative grille frame.

The lighting device can also be referred to as an illuminated ring, which can be arranged on the inside or outside, in particular concentrically, in relation to the decorative grille ring.

It is also contemplated that the lighting device extends in parallel to the contour delimiting the decorative grille frame to the front in the vehicle longitudinal direction.

The above-described advantages with respect to legal-technical, but also design-technical requirements can thus be further improved.

The lighting device can have an outer skin and a light source arranged inside the outer skin.

As already described above, the light source can be an LED.

The outer skin can include at least two different materials, wherein a first of the two materials can be light-opaque to light emitted by the light source, and a second of the two materials can be light-transmissive to the light emitted by the light source and can have volume-scattering properties.

The outer skin of the lighting device can be essentially U-shaped in cross section and can have two outer legs and one inner leg extending essentially in parallel to the vehicle longitudinal direction and connecting the two outer legs.

At least one of the two outer legs of the outer skin, in particular both legs, can include the first material or can consist thereof.

The inner leg of the outer skin can include the second material or can consist thereof, so that a defined light outlet surface for the light emitted by the light source is formed in front in the vehicle longitudinal direction.

The light-opaque material can accordingly define a light outlet surface of the lighting device as a type of aperture.

The two materials can be plastics, in particular chromed plastics. Additionally or alternatively, the outer skin of the lighting device may be manufactured as a materially-bonded composite.

Furthermore, a vehicle front for a vehicle is provided. The vehicle front has the above-described decorative grille.

In particular, the decorative grille can be attached via the decorative grille frame to the remaining vehicle front.

The description above with respect to the decorative grille also applies analogously to the vehicle front and vice versa.

Furthermore, a vehicle, in particular a passenger vehicle, is provided, wherein the vehicle has the above-described vehicle front.

The description above with respect to the decorative grille and the vehicle front also applies analogously to the vehicle and vice versa.

In summary, using the above-described system, damage to the light outlet surface, for example in the ECE-R42 pendulum test, can be avoided and a homogeneous appearance of the illuminated decorative grille, in particular of the decorative grille ring, can be achieved.

For this purpose, in particular a concentric arrangement of the light outlet surface of the decorative element with a contour light and a recessing of the light outlet surface and a use of volume-scattering material, which is manufactured from at least two plastic components which are arranged in a sequence light-opaque-light-transmissive-light-opaque and are manufactured in the material composite, is proposed.

The painted, unpainted, or chromed decorative grille ring can be arranged on the inside or outside concentrically in relation to the lighted kidney ring here. The light outlet surface offset to the rear of the lighted kidney ring is protected from direct pendulum contact by the decorative grille ring, which protrudes farther forward in the vehicle longitudinal direction.

The substructure of the decorative grille frame is used, on the one hand, as a receptacle for the lighted kidney ring, and also for absorbing force and passing on pendulum forces into the vehicle front. The decorative grille ring is used here as a productive surface for the contour lighting.

An embodiment is described hereinafter with reference to FIGS. 1 and 2.

DETAILED DESCRIPTION OF THE DRAWINGS

Figure 1:
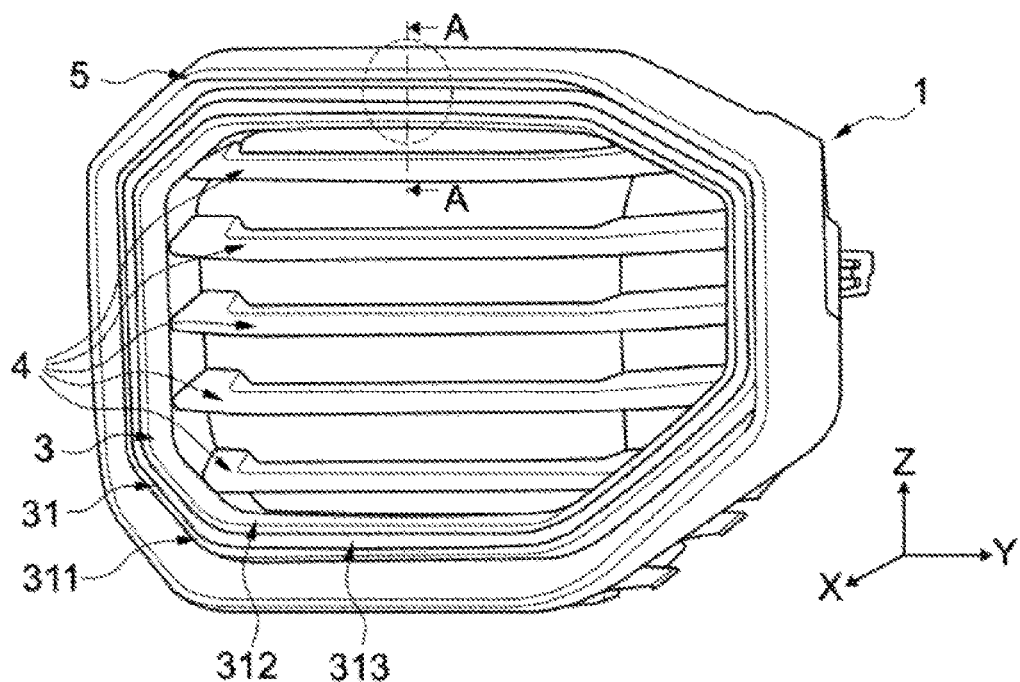
FIG. 1 is a perspective view of a decorative grille according to an embodiment of the invention.

A decorative grille 1 is shown in a perspective view alone in FIG. 1, i.e., a vehicle front of a vehicle, to which the decorative grille 1 is attachable, is not shown.

Furthermore, a Cartesian coordinate system is shown in FIG. 1, wherein X corresponds to a vehicle longitudinal direction, Y to a vehicle width direction, and Z to a vehicle vertical direction.

FIG. 1 corresponds here to a view essentially from the vehicle longitudinal direction X and slightly offset from the vehicle width direction Y.

In the installed state of the decorative grille, an engine compartment of the vehicle is generally arranged behind the decorative grille. Depending on the installed drive assembly, an air flap arrangement having an airflow controller can be installed between the engine compartment and the decorative grille.

Figure 2:
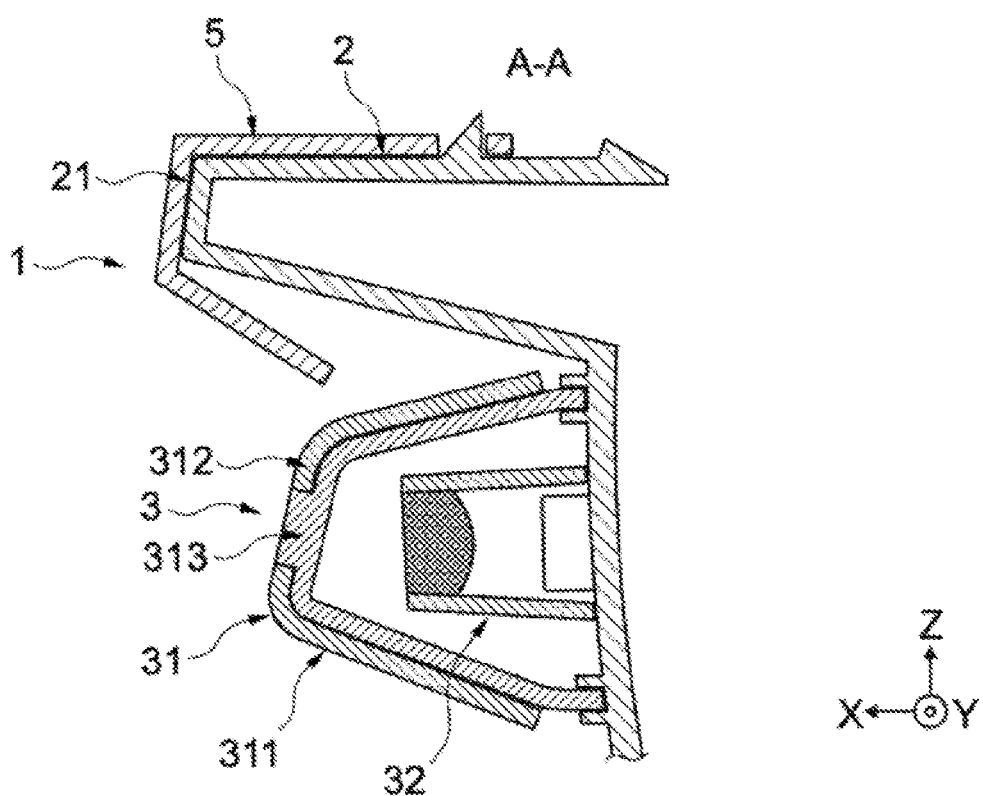
FIG. 2 is a partial sectional view of the decorative grille from FIG. 1.

FIG. 2 is a sectional view in a plane spanned by the vehicle longitudinal direction X and vehicle vertical direction Z, to which the vehicle width direction Y is perpendicular as a normal vector.

In FIG. 2, the region of the decorative grille 1 circled in FIG. 1 and identified by the designation A-A is shown in section, wherein FIG. 2 corresponds to a schematic diagram.

The decorative grille 1 is described in detail hereinafter with reference to FIGS. 1 and 2.

The decorative grille 1 has a decorative grille frame 2 connectable to the vehicle front, ribs 4 spaced apart from one another, and a lighting device 3 arranged in front of the ribs 4 in the vehicle longitudinal direction X. The decorative grille 1 furthermore comprises a ring or trim 5 including chromium, which covers a frontmost contour 21 of the decorative grille frame 2 described in detail later.

The decorative grille frame 2 accommodates the ribs 4 and the lighting device 3. The lighting device 3, as can be seen in particular from FIG. 2, is arranged here completely behind a frontmost point of the decorative grille frame 2 in the vehicle longitudinal direction X.

More precisely, the lighting device 3 is arranged in the vehicle longitudinal direction X in the present embodiment completely behind the contour 21 having the frontmost point and delimiting the decorative grille frame 2 to the front in the vehicle longitudinal direction X.

In the present case, the frontmost contour 21 of the decorative grille frame 2 extends essentially in parallel to the vehicle vertical direction Z and forms a type of protective shield for the lighting device 3 arranged behind it.

In the event of an impact of an external impactor on the decorative grille, for example the pendulum in the ECE-R42 pendulum test, the frontmost contour 21 of the rigidly embodied decorative grille frame 21 absorbs the energy of the impactor and passes it on to a component of the vehicle front arranged behind the decorative grille 2 in the vehicle longitudinal direction.

This prevents the impactor from coming into contact with the lighting device 3 and damaging it.

In the present case, the lighting device 3 is arranged inside the decorative grille frame 2 and below the frontmost contour 21 of the decorative grille frame 2 in the vehicle vertical direction Z.

The lighting device 3 follows the frontmost contour 21 of the decorative grille frame 2, i.e., the lighting device 3 extends in parallel to the contour 21 delimiting the decorative grille frame to the front in the vehicle longitudinal direction X.

Additionally or alternatively, it is contemplated that the lighting device 3 is arranged following the frontmost contour 21 in the same manner outside the decorative grille frame 2.

The lighting device 3 has an outer skin 31 and a light source 32 arranged inside the outer skin 31.

The outer skin 31, which essentially has a U shape in the cross section shown in FIG. 2, comprises at least two different materials.

More precisely, the outer skin 31 of the lighting device 3 is essentially U-shaped in cross section and has two outer legs and one inner leg extending essentially in parallel to the vehicle longitudinal direction X and connecting the two outer legs.

A first of the two materials is light-opaque to light emitted by the light source 32. A second of the two materials is light-transmissive to light emitted by the light source 32 and has volume-scattering properties.

In the present case, the second material, i.e., the light-transmissive material, is formed as a type of carrier structure 313 in a U shape. Two parts 311, 312 acting as an aperture and made of the first, i.e., the light-opaque material, are externally attached to the two outer legs of the carrier structure 313. A defined light outlet surface for the light emitted by the light source 32 is thus formed in the front in the vehicle longitudinal direction X.

It is contemplated that the two materials include plastics, for example, polycarbonate, in particular chromed plastics, or consist thereof. The outer skin 31 of the lighting device 3 can be manufactured as a materially-bonded composite in this case.

LIST OF REFERENCE NUMERALS

1 decorative grille
2 decorative grille frame
21 contour delimiting the decorative grille frame to the front
3 lighting device
31 outer skin
311, 312 light-opaque aperture
313 light-transmissive carrier structure
32 light source
4 ribs
5 trim

The invention claimed is:

1. A decorative grille for a vehicle front of a vehicle, comprising:
a decorative grille frame connectable to the vehicle front, the decorative grille frame accommodating and fully encircling ribs of the grille which are spaced apart from one another; and
a lighting device comprising a light outlet surface,
wherein the decorative grille frame receives the lighting device,
wherein the lighting device is arranged completely behind a frontmost point of the decorative grille frame in a vehicle longitudinal direction at least to an extent required to meet legal-technical test requirements defined in ECE-R42 and/or US Part 581 in effect on the filing date hereof without damage to the light outlet surface,
wherein the light outlet surface is arranged outside of, and in front of, the ribs in a vehicle longitudinal direction,
wherein the decorative grille frame has a contour delimiting the grille frame to the front in the vehicle longitudinal direction, and
the lighting device extends in parallel to the contour while fully encircling the ribs.

2. The decorative grille according to claim 1, wherein the lighting device is arranged inside and/or outside the decorative grille frame.

3. The decorative grille according to claim 1, wherein the lighting device has an outer skin and a light source arranged inside the outer skin,
the outer skin includes at least two different materials,
a first of the two materials is light-opaque to a light emitted by the light source, and
a second of the two materials is light-transmissive to the light emitted by the light source and/or has volume-scattering properties.

4. The decorative grille according to claim 3, wherein the outer skin of the lighting device is U-shaped in cross section and has two outer legs extending essentially in parallel to the vehicle longitudinal direction and one inner leg connecting the two outer legs,
at least one of the two outer legs of the outer skin includes the first material or is made thereof, and
the inner leg of the outer skin includes the second material or is made thereof, so that a defined light outlet surface for light emitted by the light source is formed in front in the vehicle longitudinal direction.

5. The decorative grille according to claim 3, wherein the two materials are plastics and/or the outer skin of the lighting device is manufactured as a materially-bonded composite.

6. The decorative grille according to claim 5, wherein the plastics are chromed plastics.

7. A vehicle front for a vehicle, comprising:
the decorative grille according to claim 1, wherein the decorative grille is connected to the vehicle front.

8. A vehicle comprising the vehicle front according to claim 7.

9. The vehicle according to claim 8, wherein the vehicle is a passenger vehicle.

* * * * *